Feb. 3, 1959 R. TATSCH 2,872,035
NESTED CONDUITS
Filed July 25, 1955 6 Sheets-Sheet 1

RICHARD TATSCH,
INVENTOR.

Huebner, Beehler,
Worrel & Herzig.
ATTORNEYS.

Feb. 3, 1959 R. TATSCH 2,872,035
NESTED CONDUITS
Filed July 25, 1955 6 Sheets-Sheet 2
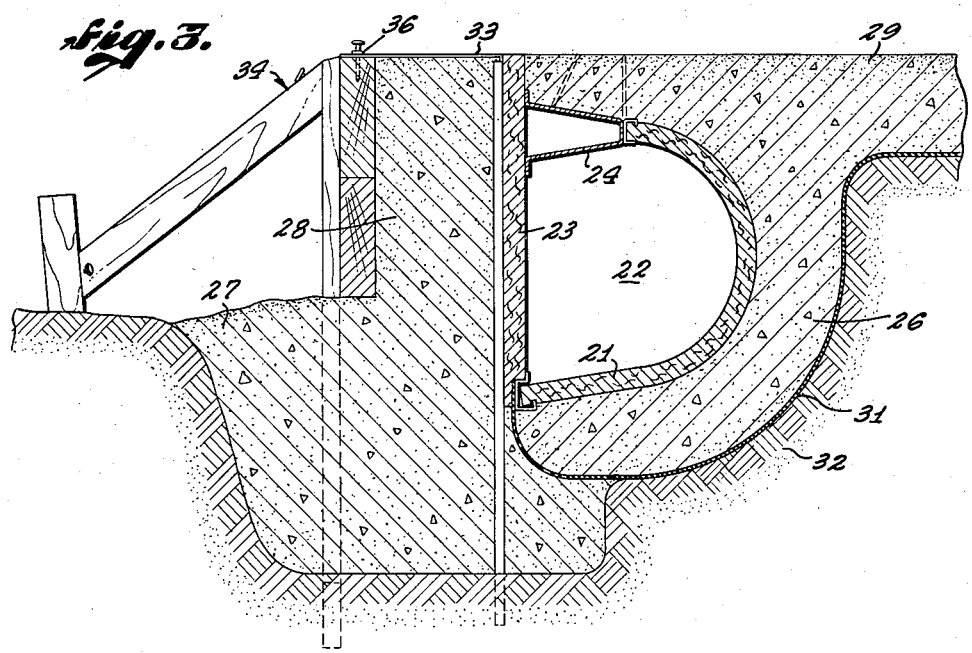
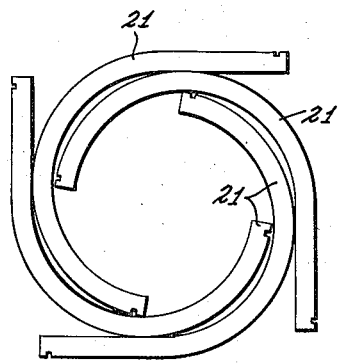 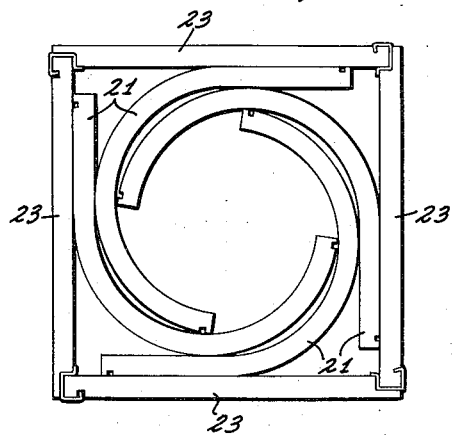
RICHARD TATSCH,
INVENTOR.
Huebner, Beehler,
Worrel & Herzig.
ATTORNEYS.

Feb. 3, 1959 R. TATSCH 2,872,035
NESTED CONDUITS

Filed July 25, 1955 6 Sheets-Sheet 3

RICHARD TATSCH,
INVENTOR.

Huebner, Beehler,
Worrel & Herzig.
ATTORNEYS.

Feb. 3, 1959

R. TATSCH 2,872,035

NESTED CONDUITS

Filed July 25, 1955

RICHARD TATSCH,
INVENTOR.

Huebner, Beehler,
Worrel & Herzig.
ATTORNEYS.

BY:

Feb. 3, 1959

R. TATSCH 2,872,035

NESTED CONDUITS

Filed July 25, 1955

RICHARD TATSCH,
INVENTOR.

Huebner, Beehler,
Worrel & Herzig.
ATTORNEYS.

BY:

Feb. 3, 1959 R. TATSCH 2,872,035
NESTED CONDUITS
Filed July 25, 1955 6 Sheets-Sheet 6

RICHARD TATSCH,
INVENTOR.

Huebner, Beehler,
Worrel & Herzig.
ATTORNEYS.

United States Patent Office 2,872,035
Patented Feb. 3, 1959

2,872,035

NESTED CONDUITS

Richard Tatsch, Silver City, N. Mex.

Application July 25, 1955, Serial No. 524,203

18 Claims. (Cl. 206—65)

The present invention relates to a means and method of arranging or packing conduit wall sections in nested relationship with respect to each other for maximum compactness.

Conduit sections, such as those used in radiant heating and cooling systems, present a troublesome transportation problem because of their bulk. They require a great deal of space and are susceptible to damage unless their bulk is increased to an even greater extent by protective padding material. These problems are especially acute in the case of conduit sections having relatively thick walls and made of materials other than single thickness metal.

For example, my invention contemplates the use of conduit wall sections which are constructed with an inner and outer shell, wherein the shells are held in a spaced relationship to each other, and wherein stresses are in part transmitted between the shells. The space between shells can be just an air space, or it can be filled with an insulating material. The walls can be made of organic or inorganic fibers held together with binder agents. In addition to defining a passage and being structurally stable, such walls also have desired thermal qualities. These walls can be molded or extruded cross sectionally. Alternatively, the walls can consist of laminates of one or several combined materials, such as a structural shell covered or lined with an insulating material of poor structural stability. In general, such walls are relatively bulky and fragile compared to the single thickness metal walls commonly used.

Accordingly, it is an important object of my invention to provide a means and method for arranging or packing conduit wall sections, wherein the sections are nested one within another so that a package of maximum compactness is obtained.

Another object is to arrange or pack conduit wall sections in a manner wherein maximum compactness is obtained and wherein the wall sections mutually protect each other from damage.

A further object is to provide a means and method for arranging or packing conduit wall sections wherein a maximum of compactness and wall protection is achieved and a minimum of packing, shipping, and storage cost is entailed.

Additional objects will become apparent from the following description:

In general terms, my invention comprises making conduit wall sections to have wall portions positioned in accordance with a generally spiral cross section so that they can be nested in groupings consisting of a number of conduit sections selected to produce an arrangement of maximum compactness. This preferably is accomplished by relating the outer surface of each of the wall portions to an arc having a radius substantially equal to that to which the inner surface of the outwardly adjacent wall portion is similarly related.

A more detailed description of specific embodiments of the invention as applied to heating and cooling conduit wall sections is given with reference to the drawings, wherein:

Figure 3 is a diagrammatic cross-sectional view showing a conduit section consisting of three components installed under a concrete floor.

Figure 4 is a schematic end view showing four conduit section walls of the type shown in Figure 3 nested one within the other, and collectively providing a square outline;

Figure 4a is a view similar to that of Figure 3 showing the nested conduit section walls boxed in four of the plane components of the embodiment shown in Figure 3;

Figure 1:
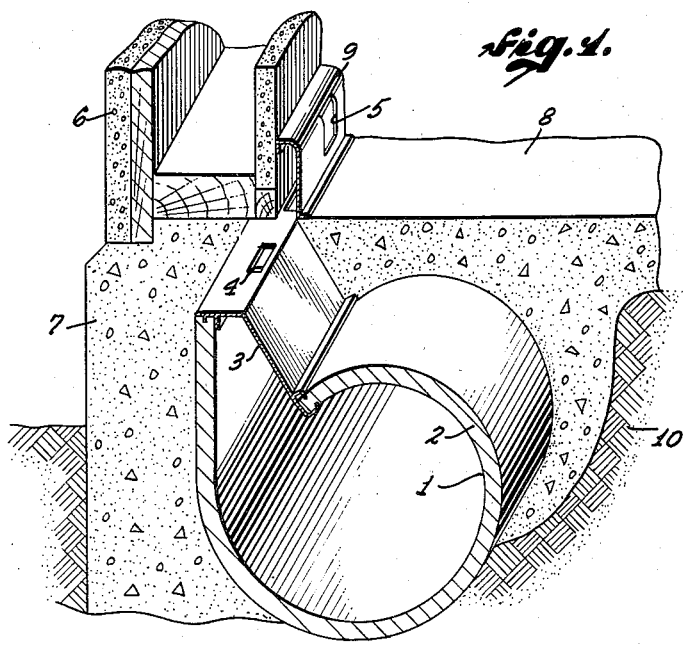
Figure 1 is a diagrammatic cutaway end view of a conduit installed under a concrete floor with a portion of the conduit wall in contact with an exterior foundation wall of a building and with the remaining portion of the conduit wall encased in concrete.

In the installed conduit shown in Figure 1, a heating or cooling fluid, such as air, is passed through the conduit interior 1. The generally spiral conduit wall 2 and manifold 3 form the enclosing wall of the conduit. An opening 4 in manifold 3 permits air, or other fluid material, to pass to or from a room, or other enclosure, of a building through a baseboard type register 9 via an opening 5. An exterior frame wall 6, concrete foundation wall 7, concrete floor 8, and supporting ground 10 form the surroundings of the conduit installation.

Figure 2:
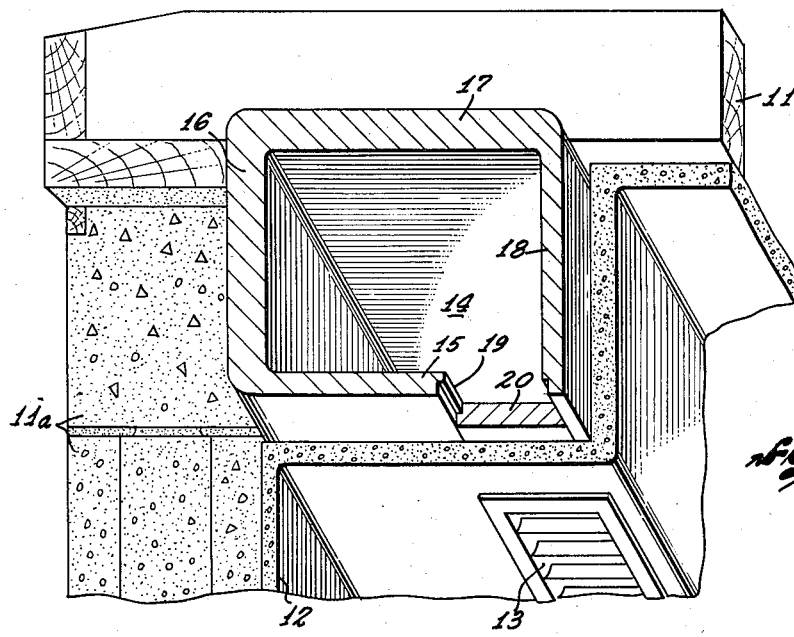
Figure 2 is a similar cutaway end view from within a building showing a conduit located under a ceiling structure adjacent to an exterior masonry building wall.

Similarly, in the installed conduit shown in Figure 2, the surroundings consist of a ceiling joist 11, an outside masonry wall 11a, and a plaster room finish material 12. The conduit interior 14 is enclosed by a conduit wall consisting of wall portions 15, 16, 17, and 18 and a gap filler 20 enclosing continuous gap 19. Wall portions 16 and 17 are thicker than wall portions 15 and 18, because they are exposed to lower temperatures adjacent the outside wall and ceiling than wall portions 15 and 18 in the interior of the room. Gap 19 is not enclosed by gap filler 20 adjacent registers 13 so that air, or other fluid, can leave or enter the space 14 through register opening 13 to or from the room, or other enclosure.

The generally spiral conduit wall shown in Fig. 3 comprises an arcuate section 21 partially enclosing the conduit interior 22, a thermal barrier 23 in board form, and a manifold 24. The conduit is shown positioned as for pouring encasing concrete 26, footing 27, foundation wall 28, and floor 29. A moisture-vapor membrane 31 is positioned between supporting ground 32 and encasing concrete 26. The thermal barrier 23 is mounted on brackets 33 driven into the ground at one end thereof and fastened to formwork 34 at 36 at the other end thereof.

Four arcuate sections 21 can be nested, as shown in Figure 4. This nesting arrangement is very compact and has a square-shaped cross-sectional outline. The four nested conduit sections are conveniently packaged within a box made of four thermal barrier boards 23, as shown in Figure 4a, for maximum compactness and wall protection and minimum of packing, shipping, and storage costs.

Figure 5:
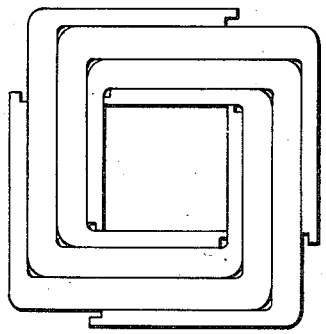
Figure 5 is a view similar to that of Figure 4 but directed to conduit wall sections having four plane wall portions of un-uniform thicknesses of the type shown in Figure 2.

A similar nesting arrangement of four conduit sections of the type shown in Figure 2 is shown in Figure 5. The nested sections again have a cross section of square shape and can be enclosed in a box or bound together by any suitable means. Protective covering material can be used to encase the nested sections or to protect the ends thereof, if desired.

Figure 7:
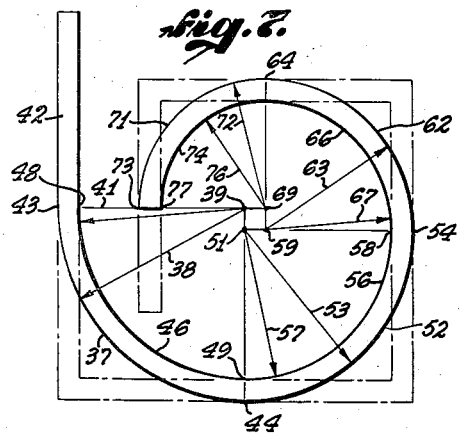
Figure 7 is a schematic view showing radii and arcs used to determine the positions and thicknesses of the wall portions of the embodiment shown in Figure 6.

The positioning and thickness of the wall portions of a conduit wall section, such as section 21 of Figures 3, 4, and 4a, designed to permit nesting for maximum compactness, is determined as shown in Figure 7. An arc 37 having a radius 38 and a center 39 on line 41, normal to straight wall extension 42, is struck from point 43 to point 44. The radius 38 is chosen in accordance with the dimensions desired in the conduit section. Arc 46 having a radius 47 is then also struck from center 39 between points 48 and 49. The difference between radii 38 and 47 is chosen according to the wall thickness desired in the first conduit wall portion 43, 44, 48, and 49.

Moving from point 39 to point 51, on a line 39—49 drawn perpendicular to line 39—48(41), a distance equal to the thickness desired in the second conduit wall portion, an arc 52 having a radius 53 equal to radius 47, is drawn from 44 to 54. Arc 56 is then drawn with radius 57 from center 51 between points 49 and 58. The difference between radii 53 and 57 is chosen according to the thickness desired in second conduit wall portion 44, 54, 58, and 49.

Moving from point 51 to point 59 on line 51—58 drawn parallel to line 39—48, a predetermined distance, an arc 62 having a radius 63 equal to radius 57, is drawn from 54 to 64. An arc 66 is then drawn with radius 67 from center 59 between points 58 and 68 to complete the third conduit wall portion 54, 64, 56, and 68. The fourth and remaining conduit wall portion is similarly constructed by moving from point 59 to point 69 on line 59—58 drawn parallel to line 51—49, a predetermined distance, and drawing an arc 71 having a radius 72 equal to radius 67, from 64 to 73. A final arc 74 is then drawn with radius 76 from center 69 between points 68 and 77 to complete the fourth conduit wall portion 64, 73, 77, and 68.

It will be observed that in developing the conduit section wall shown in Figure 7, which has four consecutive wall portions, each of the outer surfaces of the wall portions is determined by a radius substantially equal to that determining the inner surface of the outwardly adjacent wall portion. Namely, radius 72 is equal to radius 67, radius 63 is equal to radius 57, and radius 53 is equal to radius 47. It will also be observed that the four wall portions of the conduit wall section shown in Figure 7 are positioned in accordance with a generally spiral cross section.

Figure 6:
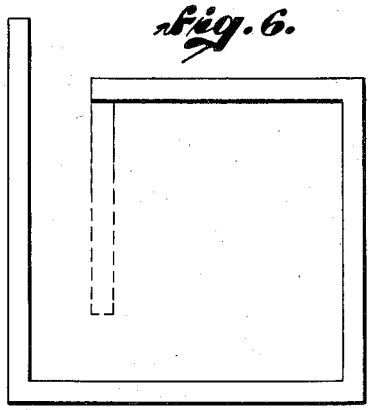
Figure 6 is a schematic end view showing a conduit section with parallel inside and outside surfaces spaced uniformly and determined as shown in Figure 7.

The lines in phantom shown in Figure 7 are drawn tangential to points 43, 44, 54, 64, and 73 to determine the outside surface of a conduit wall section such as shown in Figure 6. Lines drawn tangential to points 48, 49, 58, 68, and 77, and shown in phantom in Figure 7, determine the inside surface of the conduit wall section shown in Figure 6.

Figure 8:
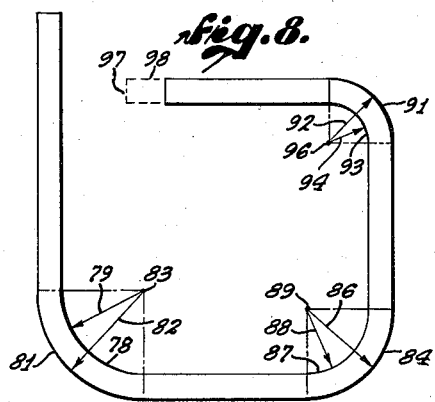
Figure 8 shows an embodiment similar to that of Figure 6 but having rounded edges

The corners of a conduit wall section such as that shown in Figure 6 can be rounded to form a conduit section such as that shown in Figure 8. This is accomplished by drawing an arc 78 of radius 79, and also an arc 81 of radius 82 from a center 83. An arc 84 having a radius 86, equal to radius 79, and an arc 87 of radius 88 are drawn from a center 89. Similarly, an arc 91 of radius 92, equal to radius 88, and an arc 93 of radius 94 are drawn from a center 96. Radius 94 increases the usual gap at 97 by the amount of the length of the radius 94 as shown in dotted lines at 98.

Figure 9:
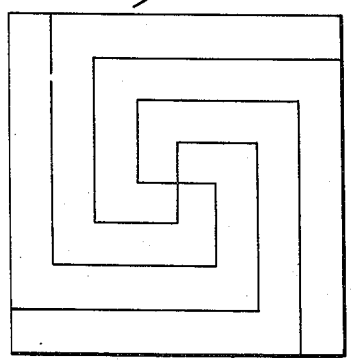
Figure 9 is a schematic end view showing four sections of the type shown in Figure 6 with their four walls nested solidly.
Figure 10:
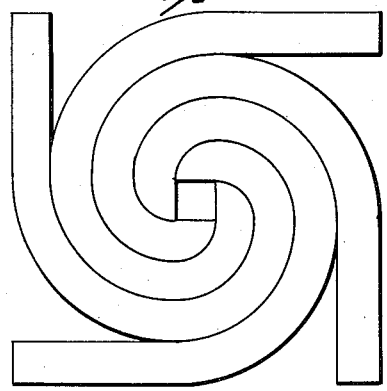
Figure 10 is a view similar to that of Figure 9 but showing four sections with thick walls of spiral cross section.

There is, of course, a limit to the wall thickness that can be built into the conduit wall sections and still have the regular number of sections nest as described above. Figure 9 shows a nested arrangement wherein the maximum wall thickness for a given overall dimension of a conduit wall section of the type shown in Figure 6 is used. The conduit sections are solidly packed against each other. Figure 10 shows a similar situation for conduit wall sections of the type shown in Figure 7.

Figure 11:
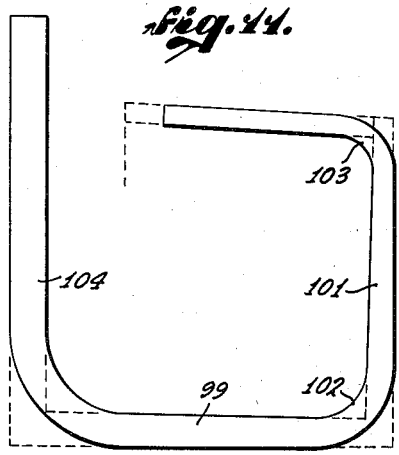
Figure 11 is a view similar to that of Figure 8 but showing two of the wall portions of the conduit section to have tapered sides.
Figure 13:
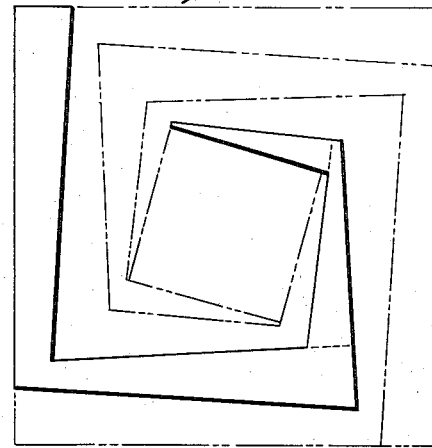
Figure 13 is a similar view showing four conduit wall sections in nested relationship.

Figure 11 shows a conduit wall section with two tapered sides 99 and 101, which have tapered curved corners 102 and 103 and which otherwise resembles a conduit section of the type shown in Figure 8. Under circumstances such as those encountered in Figure 1 by wall 2, the conduit wall section shown in Figure 11 is advantageous. In Figure 11 wall portion 104 is the thickest and it is exposed to the outside foundation wall where the thermal insulation requirements are the heaviest. The thermal insulation requirements diminish proportionately upon coming inward from the outside under the conduit until the floor above is approximated. Hence, the tapered wall.

Figure 14:
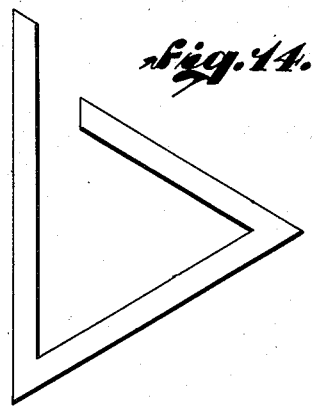
Figure 14 is a schematic end view showing a conduit section having three plane wall portions.
Figure 15:
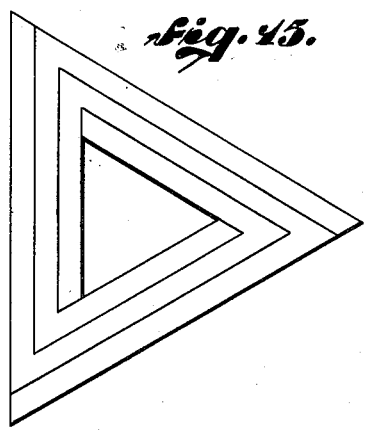
Figure 15 is a similar view showing three conduit wall sections in nested relationship.
Figure 16:
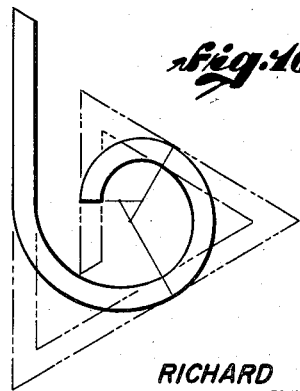
Figure 16 is a similar view showing radii and arcs used to determine the three wall portions of the conduit section shown in Figure 14.

The configuration, nesting, and construction of conduit wall sections having three consecutive plane or curved wall portions positioned in accordance with a generally spiral cross section are illustrated in Figures 14, 15, and 16. The construction of these conduit wall sections is illustrated in Figure 16 and is similar to the construction illustrated in Figure 7 for a conduit wall section having four wall portions. For that reason, it will not be repeated here.

Figure 17:
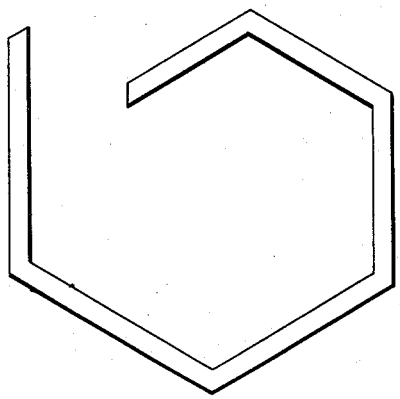
Figure 17 is a schematic end view showing a conduit section having six plane wall portions.
Figure 18:
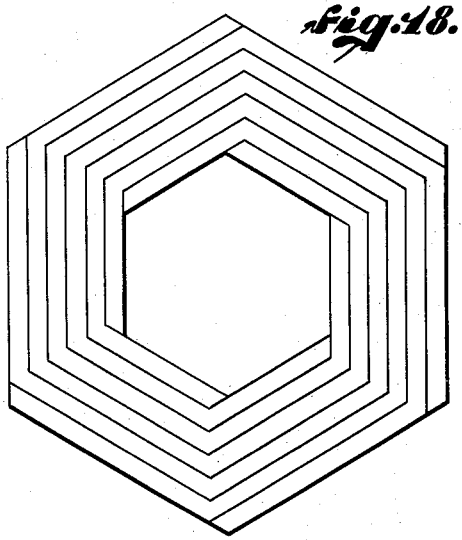
Figure 18 is a similar view showing six conduit wall sections in nested relationship.
Figure 19:
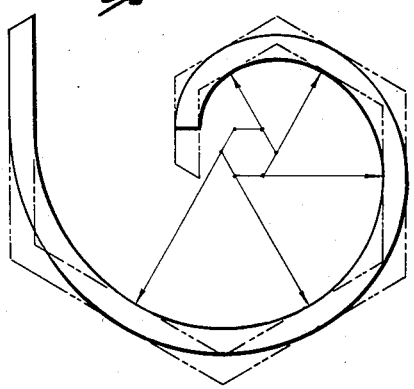
Figure 19 is a similar view showing radii and arcs used to determine the six wall portions of the conduit section shown in Figure 17.

Similarly, the configuration, nesting, and construction of a conduit wall section having six wall portions is illustrated in Figures 17, 18, and 19 and the construction will not be repeated because it is similar to that of the four wall portion embodiment described above in connection with Figure 7.

Figure 20:
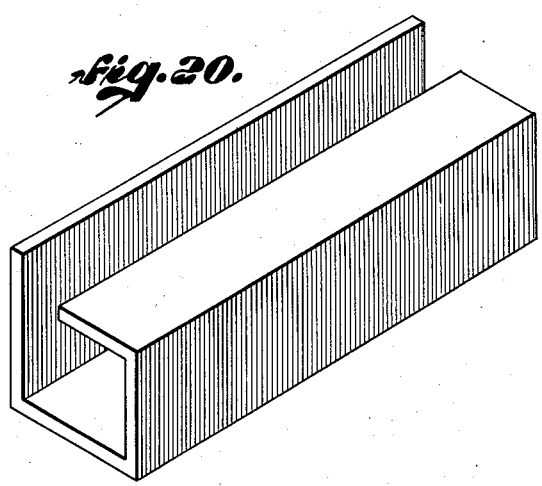
Figure 20 is a schematic perspective view showing a portion of the conduit wall section shown in end view in Figure 6.
Figure 21:
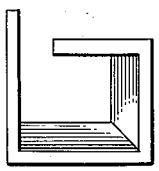
Figure 21 is a schematic end view showing a conduit wall section wherein opposed pairs of the four wall portions thereof converge toward each other.
Figure 22:
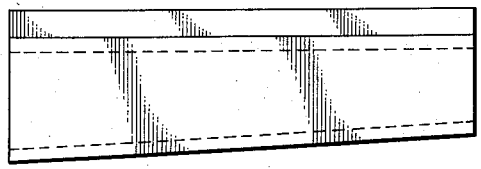
Figure 22 is a schematic side elevational view of the conduit wall section shown in Figure 21.

Tapered wall conduit sections are contemplated to be within the invention and can be composed of plane or curved wall portions positioned in accordance with a generally spiral cross section progressively changing in dimensions from one end of the section to the other. Figures 20, 21, and 22 show such an embodiment with four tapered plane wall portions.

Figure 12:
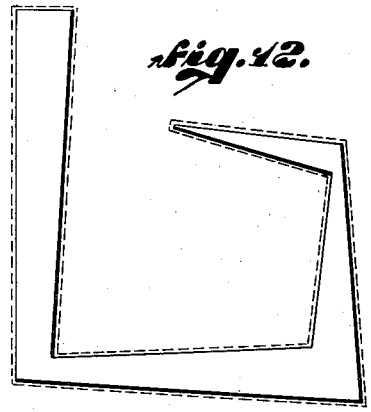
Figure 12 is a view similar to that of Figure 6 except that the surfaces of the walls are unparallel and the walls are of uneven thickness; the dotted lines represent the design lines and the solid lines the actual wall surfaces produced after making allowance for clearances.
Figure 23:
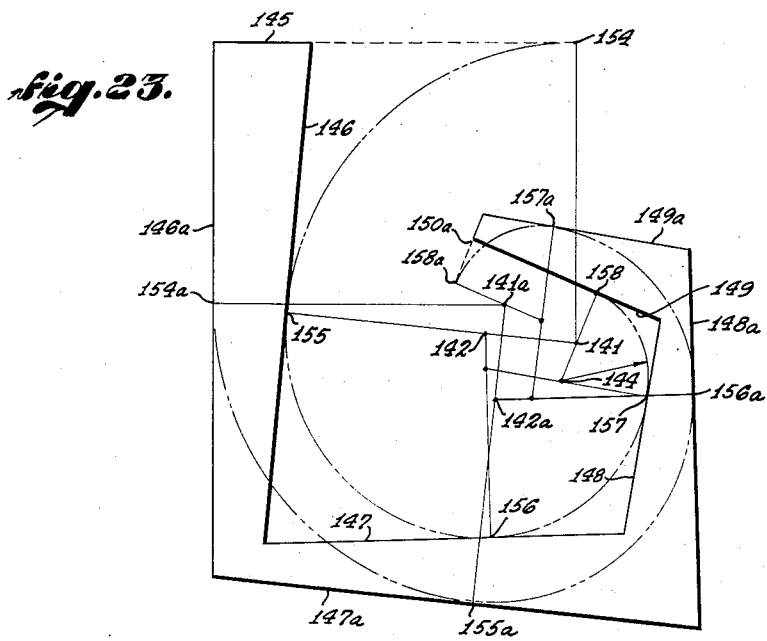
Figure 23 is a schematic end view showing radii and arcs used to determine the positions of the wall portions of the embodiment shown in Figure 12.

Figures 12 and 23 show a conduit wall section having four wall portions, wherein the outside and inside wall lines vary in width. The procedure used to evolve this wall is similar to that described above in connection with Figure 7. Figure 23 can be described as a four-directional curved spiral wall having inside and outside wall bounds derived from alternating inside to outside duplicate identical curved wall sections, with each directional inside to outside grouping using a shorter radius than the preceeding grouping but wherein both inside and outside curved lines are joined at points of mutual tangency. The outside radius line from center 141a to 154a commenced rotationally ninety degrees from inside starting radius line 141 to 154. The arc scribed from 154 to 155 equals arc 154a to 155a, but herein radius lines 154a to 141a and 155 to 141 do not coincide. Next in rotational order arc 155 to 156 is equalled by arc 155a to 156a. Starting radius line 155 to 142 coincides as to degree on finish radius line 155 to 141. Outside radius starting line 155a to 142a coincides as to degree with 155a to 141a. And so on around 156 to 157 repeated and equalled in 156a to 157a. Then 157 to 158 repeated and equalled in 157a to 158a. By fully projecting outside tangent lines 146a, 147a, 148a, 149a, and end 150a, which in reality is an outside tangent line, and then commencing again with inside tangent line 145, end 145 is established followed by 146, 147, 148, and 149. This procedure is typical. When outside and inside walls are evolved which are parallel, and of the same width, inside and outside radii will fall upon one another. This is reflected in the distance between the radius centers.

Figure 24:
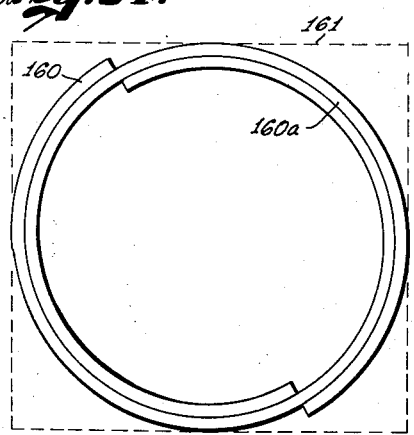
Figure 24 is a schematic end view showing two spiral conduit wall sections in nested relationship.

Figure 24 shows two conduit wall sections, each of identical one hundred and eighty-degree spiralled walls 160 and 160a, nested in a 180-degree counter-rotational relationship, bounded by a rectangular line 161.

Figure 25:
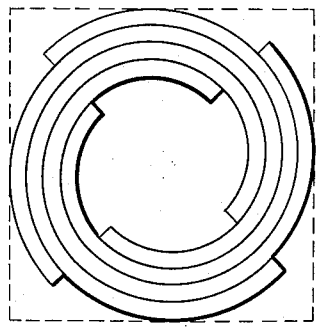
Figure 25 is a similar view showing four spiral conduit wall sections in nested relationship.

Figure 25 shows four conduit wall sections of the ninety-degree rotational type nested and bounded by a square dotted line.

In general, the rotational angle corresponding to the determining arc of each wall portion in the generally spiral cross section of a conduit wall section is determined by the number of wall portions. Thus, a conduit wall section having four wall portions will be developed by arcs corresponding to rotational angles of 90 degrees, that is, 360 degrees divided by four. The number of wall portions in a conduit wall section also will determine the number of conduit wall sections that can be nested for maximum compactness. Thus, four nested conduit wall sections will produce a nesting arrangement of maximum compactness when the conduit wall sections contain four spirally determined wall portions.

It will be observed that in the above embodiments of my invention, a means and method of arranging or packing conduit wall sections is provided which results in maximum compactness and protection against damage as well as minimum packing, shipping or storage cost. Various embodiments of the invention have been described as applied to specific types of heating or cooling conduit wall sections. The foregoing description is, however, given primarily to illustrate certain embodiments of my invention, and is not given by way of limitation thereof. It is understood that variations, changes, and modifications of the embodiments illustrated and described above will occur to one skilled in the art, especially in connection with the application of the invention to a variety of situations and circumstances other than the particular ones discussed above. Accordingly, it is understood that such applications of my invention, and such changes, variations, and modifications of the embodiments thereof illustrated and described above, may be made within the scope of the appended claims without departing from the spirit of the invention.

What I claim is:

1. A package containing a plurality of nested conduit wall sections, wherein the conduit sections have wall portions positioned tangentially with respect to a generally spiral cross section, the outer surface of each wall portion being tangential to an arc having a radius substantially equal to that of an arc to which the inner surface of the outwardly adjacent wall portion is tangential.

2. A package containing a plurality of nested conduit wall sections, wherein the conduit sections have four wall portions positioned tangentially with respect to a generally spiral cross section, the outer surface of each wall portion being tangential to an arc having a radius substantially equal to that of an arc to which the inner surface of the outwardly adjacent wall portion is tangential.

3. A package of a plurality of elongate conduits of a given number, the conduits being substantially identical to each other in their corresponding cross-sectional dimensions, each conduit comprising longitudinally extending wall portions equal in number to said given number and arranged side along side successively so that each conduit in cross section circumscribes a generally spiral form with each wall portion being integral along its side with its next adjacent wall portion, there being a first wall portion, a second wall portion integral with and disposed inwardly of said first wall portion along said spiral form, and a last wall portion disposed inwardly along said spiral form with respect to said first and second wall portions, the wall portions being of similar geometrical configuration in cross-section, the first and last wall portions being spaced apart to provide a gap extending longitudinally of the conduit, the contour of the inside surface of each wall portion except the first being similar to the outside surface of a like adjacent inwardly, progressively positioned wall portion and the widths of said surfaces of each pair of like adjacent portions between the first and the last being the same, wherein the inside surface of each wall portion except the last wall portion of each conduit being disposed in face toward face relationship with the outside surface of the next adjacent inwardly disposed wall portion of another conduit respectively.

4. A package according to claim 3 in which the inside and outside surfaces of the wall portions are plane surfaces, the wall portions of each conduit are four in number, and each wall portion is disposed at substantially 90° with respect to its next adjacent wall portion.

5. A package according to claim 3 in which the inside and outside surfaces of the wall portions are plane surfaces, and the wall portions of each conduit are three in number.

6. A package according to claim 3 in which the inside and outside surfaces of the wall portions are plane surfaces, and the wall portions of each conduit are six in number.

7. A package according to claim 3 in which the inside and outside surfaces of the wall portions consist of a circle arc, and the wall portions of each conduit are four in number.

8. A package according to claim 3 in which the inside and outside surfaces of the wall portions are plane surfaces with the meeting edges of adjacent wall portions being rounded.

9. A package of four elongate conduits, the conduits being substantially identical to each other in their cross-sectional dimensions, each conduit comprising first, second, third, and fourth longitudinally extending wall portions arranged successively so that each conduit in cross section circumscribes a generally spiral form with each wall portion being integral along its side with its next adjacent wall portion, the second, third and fourth wall portions being integral with and disposed inwardly of said first, second and third wall portions, respectively, along said spiral form, the first and fourth wall portions being spaced apart to provide a gap extending longitudinally of the conduit, the width of the outside surface of the third wall portion being substantially equal to the width of the inside surface of the second wall portion, the inside surfaces of the first, second, and third wall portions of each conduit being disposed in face toward face relationship with the outside surfaces of the second, third and fourth wall portions respectively of another conduit, the medial longitudinal line in the inside surface of the second wall portion of each conduit being coincident with the medial longitudinal line in the outside surface of the third wall portion of another conduit.

10. A package according to claim 9 in which the inside and outside surfaces of the wall portions are arcuate in cross-section.

11. An elongate conduit comprising in cross-section a given number of successive wall portions circumscribing a generally spiral form with each wall portion being integral along its side with its next adjacent wall portion, there being a first wall portion, a second wall portion integral with and disposed inwardly of said first wall portion along said spiral form, and a last wall portion disposed inwardly along said spiral form with respect to said first and second wall portions, the outside and inside surfaces of each wall portion being plane surfaces, the first and last wall portions being spaced apart to provide a gap extending longitudinally of the conduit, the width of the inside surface of at least each wall portion except the first wall portion being substantially equal to the width of the outside surface of its adjacent inwardly disposed wall portion.

12. A package of at least two elongate conduits, the conduits being substantially identical to each other in their cross-sectional dimensions, each conduit comprising at least first and last longitudinally extending wall portions arranged side along side so that each conduit in cross-section circumscribes a generally spiral form with each wall portion being integral along its side with its next adjacent wall portion, the wall portion next adjacent said first wall portion being disposed inwardly along said spiral form with respect to said first wall portion, said last wall portion being disposed inwardly along said spiral form with respect to the wall portion next adjacent said last wall portion, the cross-section of each wall portion consisting of an arc of a circle, a chord subtending the arc of the inside surface of a wall portion of each conduit being substantially equal to a chord subtending the arc of the outside surface of the next adjacent inwardly disposed wall portion of another conduit respectively, the inside surface of the first wall portion of each conduit being disposed in face toward face relationship with the outside surface of the next adjacent inwardly disposed wall portion of another conduit respectively.

13. A package according to claim 12 in which all wall portions are geometrically similar to each other.

14. A package of a plurality of elongate conduits of a given number, the conduits being substantially identical to each other in their corresponding cross-sectional dimensions, each conduit comprising longitudinally extending wall portions equal in number to said given number and arranged side along side successively so that each conduit in cross section circumscribes a generally spiral form with each wall portion having plane inside and outside surfaces and being integral along its side with its next adjacent wall portion, there being a first wall portion, a second wall portion integral with and disposed inwardly of said first wall portion along said spiral form, and a last wall portion disposed inwardly along said spiral form with respect to said first and second wall portions, the wall portions being of similar geometrical configuration in cross section, the first and last wall portions being spaced apart to provide a gap extending longitudinally of the conduit, the width of the inside surface of at least each wall portion except the first wall portion being substantially equal to the width of the outside surface of its adjacent inwardly disposed wall portion, the inside surface of each wall portion except the last wall portion of each conduit being disposed in face to face contact with the outside surface of the next adjacent inwardly disposed wall portion of another conduit respectively.

15. A package according to claim 14 in which the wall portions of each conduit are four in number, and each wall portion is disposed at substantially 90° with respect to its next adjacent wall portion.

16. A package according to claim 14 in which the wall portions of each conduit are three in number.

17. A package according to claim 14 in which the wall portions of each conduit are six in number.

18. A package according to claim 14 in which the meeting edges of adjacent wall portions are rounded.

References Cited in the file of this patent

UNITED STATES PATENTS

| | | |
|---|---|---|
| 1,448,090 | Buhr | Mar. 25, 1924 |
| 1,794,102 | Comins | Feb. 24, 1931 |
| 2,241,644 | Nichols et al. | May 13, 1941 |
| 2,599,427 | Bellingher | June 3, 1952 |